United States Patent
Sun et al.

(10) Patent No.: US 8,861,636 B2
(45) Date of Patent: Oct. 14, 2014

(54) COHERENT DETECTION USING COHERENT DECODING AND INTERLEAVING

(75) Inventors: Han Henry Sun, Ottawa (CA); Kuang-Tsan Wu, Kanata (CA); Yuejian Wu, Ottawa (CA); Sandy Thomson, Ottawa (CA)

(73) Assignee: Infinera Corporation, Sunnyvale, CA (US)

(*) Notice: Subject to any disclaimer, the term of this patent is extended or adjusted under 35 U.S.C. 154(b) by 0 days.

(21) Appl. No.: 13/250,462

(22) Filed: Sep. 30, 2011

(65) Prior Publication Data

US 2013/0022147 A1  Jan. 24, 2013

Related U.S. Application Data

(60) Provisional application No. 61/510,583, filed on Jul. 22, 2011.

(51) Int. Cl.
  *H04L 27/18* (2006.01)
  *H04L 1/20* (2006.01)
  *H04L 1/00* (2006.01)
  *H04B 10/61* (2013.01)

(52) U.S. Cl.
  CPC .............. *H04B 10/6165* (2013.01); *H04L 1/20* (2013.01); *H04L 1/0041* (2013.01); *H04L 1/0071* (2013.01); *H04L 2/223* (2013.01); *H04L 1/0045* (2013.01)
  USPC ........... 375/279; 375/296; 375/298; 375/300; 375/308; 375/316; 375/325; 398/152; 398/182; 398/183; 398/184; 398/188; 714/751; 714/752; 714/780

(58) Field of Classification Search
  USPC .............. 375/298, 320; 398/26, 79, 188, 208; 714/780
  See application file for complete search history.

(56) References Cited

U.S. PATENT DOCUMENTS

2006/0245766 A1  11/2006  Taylor
2009/0257454 A1* 10/2009  Maltsev et al. ............... 370/480

(Continued)

FOREIGN PATENT DOCUMENTS

EP  1418699  * 1/2007  ............... H04L 7/04
WO  WO 02/091645  11/2002

OTHER PUBLICATIONS

Mumtaz et al., "Efficient interleaving of FEC codewords for optical PSK systems," 35$^{th}$ European Conference on Optical Communication, 2009, ECOC '09, Sep. 20, 2009, Paper P3.02.

(Continued)

*Primary Examiner* — Daniel Washburn
*Assistant Examiner* — Eboni Hughes
(74) *Attorney, Agent, or Firm* — Harrity & Harrity LLP; David L. Soltz

(57) ABSTRACT

A system is configured to receive a block of symbols, associated with a phase-modulated signal that includes data symbols that correspond to a payload associated with the signal, and control symbols; process the control symbols to identify an amount of phase noise associated with the control symbols; reset a phase, associated with each of the data symbols, based on the amount of phase noise and a reference phase; interleave the respective data samples, of each of the data symbols with other data samples, where the interleaved respective data samples cause errors, associated with the respective data samples, to be spread out among the other data samples and reduces an error rate relative to a prior data rate that existed before the interleaving; and perform forward error correction on the interleaved respective data samples.

22 Claims, 8 Drawing Sheets

(56) References Cited

U.S. PATENT DOCUMENTS

| | | | |
|---|---|---|---|
| 2010/0046942 A1* | 2/2010 | Taylor | 398/26 |
| 2010/0232796 A1* | 9/2010 | Cai | 398/79 |
| 2011/0150505 A1* | 6/2011 | Roberts et al. | 398/208 |
| 2011/0299628 A1* | 12/2011 | Ko et al. | 375/298 |

OTHER PUBLICATIONS

EPO Communication dated Jan. 2, 2013, in European Patent Application No. EP 12 17 7492.

* cited by examiner

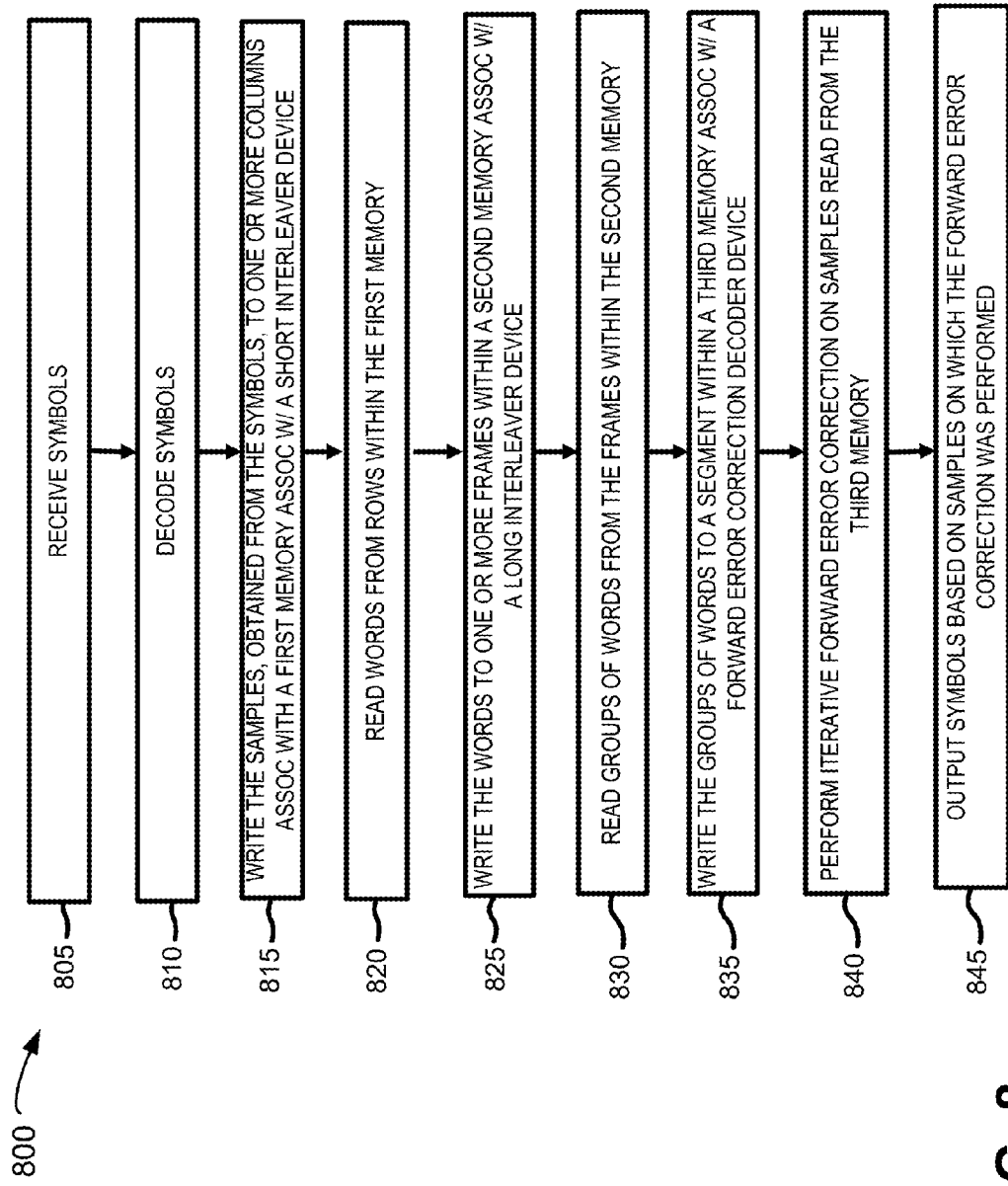

US 8,861,636 B2

COHERENT DETECTION USING COHERENT DECODING AND INTERLEAVING

REFERENCE TO RELATED APPLICATION

This application claims priority to U.S. Provisional Patent Application No. 61/510,583, filed Jul. 22, 2011, the entire contents of the provisional application being incorporated herein by reference.

BACKGROUND

Coherent optical receivers process traffic, in the form of optical signals, received from an optical network. Coherent optical receivers process the optical signals by performing operations on the optical signals, such as polarization beam splitting, demodulation, analog-to-digital conversion, etc. The processing, performed by the coherent optical receivers, usually includes coherent processing using a local oscillator that is matched to a carrier frequency that is generated by a remote oscillator in an optical transmitter.

Differential coherent detection techniques, employed in optical receivers, may minimize cycle slip-induced bit errors associated with traffic that has been phase modulated (e.g., based on binary phase shift keying (BPSK), quadrature phase shift keying (QPSK), etc.). Reducing the errors caused by the cycle slips may result in reducing a bit error rate associated with traffic. Unfortunately, the differential coherent detection techniques often introduce a noise penalty, which may reduce system range.

SUMMARY

According to one implementation, a method may include receiving, by a network device, a block of symbols associated with a phase-modulated signal, where the block of symbols may include data symbols that correspond to a payload associated with the signal, and control symbols; obtaining, by the network device, the control symbols from the block of symbols; processing, by the network device, the control symbols to identify an amount of phase noise associated with the control symbols; and resetting, by the network device, a respective phase, associated with each of the data symbols, based on the amount of phase noise and at least one reference phase. The method may also include interleaving, by the network device and as a result of resetting the phase, respective data samples, associated with each of the data symbols, with other data samples, where interleaving the respective data samples with the other data samples may cause consecutive errors, associated with the respective data samples, to be spread out among the other data samples and reduces an error rate relative to a prior error rate that existed before the interleaving; and performing, by the network device, forward error correction on the interleaved respective data samples.

According to another implementation, a system may include a decoder device to receive a block of symbols, associated with a phase-modulated signal, where the block of symbols may include control symbols embedded within the block of symbols; identify an amount of phase noise associated with the control symbols; and reset a phase associated with the block of symbols based on an amount of phase noise and a reference phase that is identified based on the amount of phase noise. The system may also include one or more interleavers to write samples, associated with the block of symbols, to a first memory associated with the one or more interleavers, where the samples may correspond to real components and imaginary components of symbols, within the block of symbols; read, from the first memory, one or more words that include the samples associated with the block of symbols and other samples associated with one or more other blocks of symbols in a manner that interleaves the samples with the other samples, write the one or more words to a second memory associated with the one or more interleavers; and read, from the second memory, one or more groups of words that include the one or more words and one or more other words, stored within the second memory, in a manner that interleaves the one or more words with the one or more other words. The system may further include an error correction device to perform forward error correction on the one or more words that are interleaved with the one or more other words; and output the one or words and the one or more other words after performing the forward error correction.

According to a further implementation, a network device may include a decoder component to receive a block of symbols, associated with a phase-modulated signal, the block of symbols including control symbols that are embedded within the block of symbols; and reset a phase associated with the block of symbols based on an amount of phase noise associated with the control symbols, where resetting the phase, when a cycle slip has occurred, may cause errors to occur within samples associated with all or a portion of the block of symbols, where the samples may correspond to in-phase components or quadrature components symbols within the block of symbols. The device may also include one or more interleavers to interleave the samples with other samples being processed by the network device, where interleaving the samples may cause all or the portion of the block of symbols, that includes the errors, to be spread out among the other symbols. The device may further include an error correction component to write, to a memory associated with the error correction component and based on a first order, the samples that are interleaved with the other samples; read, from the memory, the samples and the other samples based on a second order that is different than the first order; perform a forward error correction operation on the samples and the other samples to correct the errors in all or the portion of the block of symbols; and output the samples and the other samples after performing the forward error correction.

BRIEF DESCRIPTION OF THE DRAWINGS

FIG. 8 is a flow chart of an example process for performing interleaving and/or FEC operations on traffic, according to an implementation described herein.

DETAILED DESCRIPTION

The following detailed description refers to the accompanying drawings. The same reference numbers in different drawings may identify the same or similar elements. Also, the following detailed description does not limit the implementations.

A system and/or method, in an example implementation described herein, may permit a coherent optical receiver to perform coherent detection, on received traffic, using a coherent decoding technique to reduce and/or identify an occurrence of cycle slips within the traffic. Cycle slip may be caused when a quantity of phase noise (e.g., phase delay), associated with a phase-modulated signal, causes a first symbol to be interpreted as another symbol having a phase that corresponds to the quantity of phase noise. The system and/or method may also permit the coherent optical receiver to perform the coherent processing using one or more interleaving techniques to cause an error rate (e.g., a bit error rate, a symbol error rate, etc.), associated with the traffic, to be reduced to a level that is less than a threshold. Reducing the error rate to the level that is less than the threshold may allow forward error correction to be performed on the traffic.

The system and/or method may permit the coherent detection to be performed, on the received traffic, without using differential encoding and/or decoding. Performing coherent detection, without performing differential encoding and/or decoding, may avoid a noise penalty (e.g., of approximately one decibel (dB)) when processing the traffic. Avoiding the noise penalty may increase system reach (e.g., up to 25%), which allows the traffic to be transported greater distances than when differential encoding and/or decoding is performed on the traffic.

In the description below, certain operations, such as coherent encoding, coherent decoding, interleaving, error correction, and/or other operations, are described as being performed on traffic that has been modulated using quadrature phase shifting keying (QPSK) techniques. In another implementation, the certain operations may be performed using another type of phase modulation, such as binary phase shift keying (BPSK), higher-order phase shift keying (e.g., 8-PSK, etc.), etc. Thus, the examples below that describe the certain operations being performed on traffic, that has been modulated based on QPSK, are provided for explanatory purposes.

Figure 1:
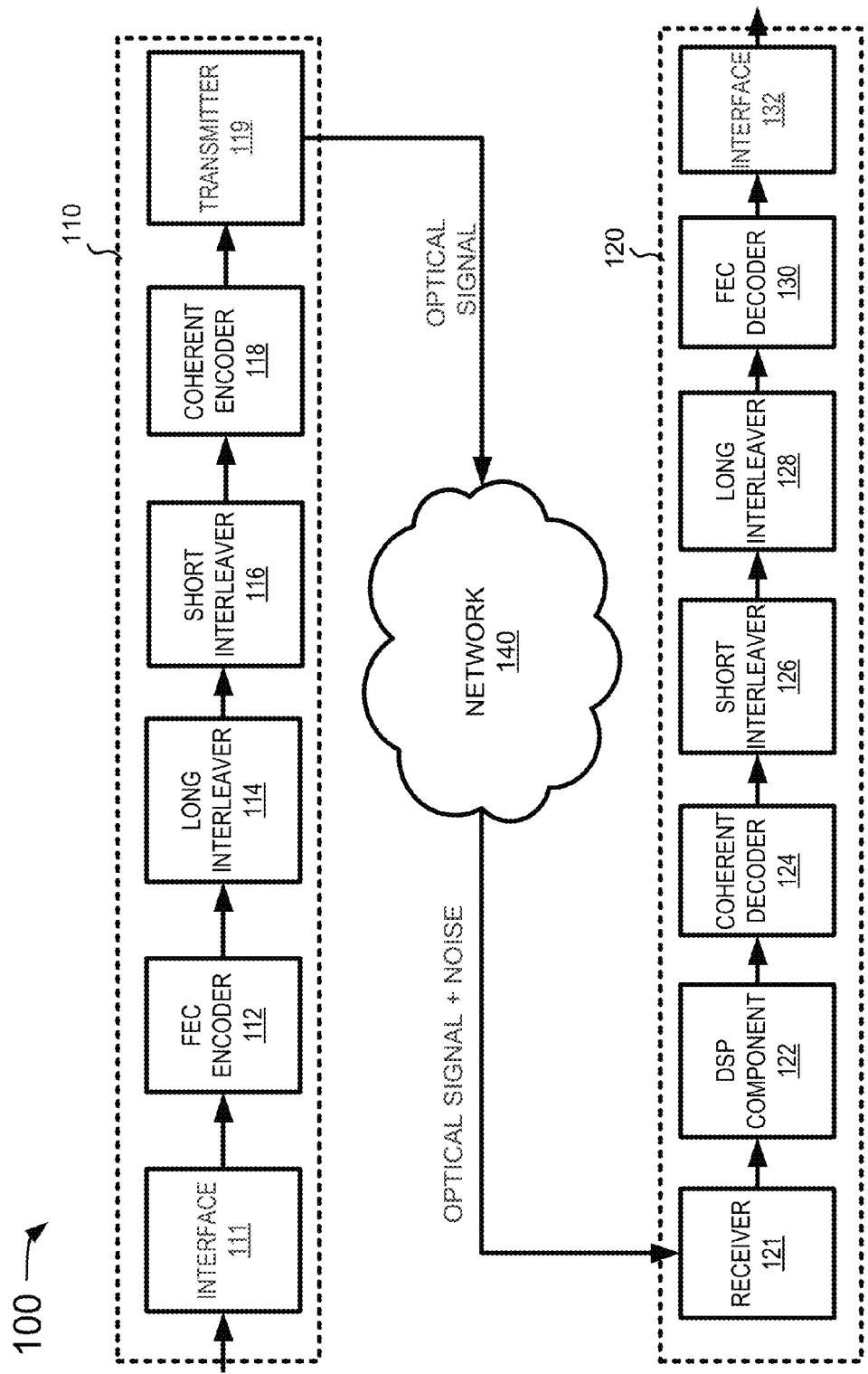
FIG. 1 is a block diagram of an example environment in which systems and/or methods described herein may be implemented.

FIG. 1 is a block diagram of an example environment 100 in which systems and/or methods described herein may be implemented. Environment 100 may include an optical transmitter 110, an optical receiver 120, and a network 140. Optical transmitter 110 may include one or more devices that generate, process, and/or transmit an optical signal. In an example implementation, optical transmitter 110 may be a network device. Optical transmitter 110 may include an interface 111, a forward error correction (FEC) encoder 112, a long interleaver 114, a short interleaver 116, a coherent encoder 118, and a transmitter 119. Optical transmitter 110 may receive an electrical signal, from a client device, may process the electrical signal, and may generate an encoded optical signal based on the processed electrical signal. Optical transmitter 110 may transmit the encoded optical signal to optical receiver 120 via network 140 (e.g., via an optical fiber, a fiber optic cable, a fiber plant, etc.).

Interface 111 may include one or more components that are capable of receiving electrical signals and/or outputting electrical signals in a particular format, data rate, bandwidth, etc. For example, interface 111 may receive, from a client device, an electrical signal associated with a first format, data rate, bandwidth, etc. and may transmit the electrical signals to FEC encoder 112 based on a second format, data rate, bandwidth, etc.

FEC encoder 112 may include one or more components that provide encoding of a signal, received from interface 111, that allows errors, within the signal, to be identified, managed, and/or corrected by optical receiver 120. FEC encoder 112 may encode the signal using an error correction code (ECC) (e.g., a Bose, Ray-Chaudhuri, and Hocquenghem (BCH) code, or some other ECC). Additionally, or alternatively, FEC encoder 112 may write encoded words and/or symbols to rows and/or columns of a memory associated with FEC encoder 112. FEC encoder 112 may read the symbols, from the memory, in a different manner in which the words and/or symbols were written to the memory. The order of the read words and/or symbols may be non-contiguous relative to the order that the words and/or symbols were written to the memory.

Each symbol may include one or more bits that correspond to payload data and/or information used for error correction. Each symbol may represent a respective polarization (e.g., a transverse magnetic (TM) (hereinafter referred to as Y-polarization), transverse electric (TE) (hereinafter referred to as X-polarization)), a quadrature component (Q), an in-phase component (I), etc.

Long interleaver 114 may include one or more components that provide interleaving of words and/or symbols received from FEC encoder 112 (e.g., via one or more channels). In one example, long interleaver 114 may write words and/or symbols to a memory, associated with long interleaver 114, in a particular order. For example, a first block of symbols (e.g., X1, X2, X3, etc.), associated with a first polarization, and a second block of symbols (e.g., Y1, Y2, Y3, etc.), associated with a second polarization, may be written in a manner that is no longer contiguous (e.g., X1, X2, Y1, Y2, etc.). Long interleaver 114 may also, or alternatively, interleave words and/or symbols associated with other components of the signal (e.g., Q and/or I components), to create another combined set of signals (e.g., XI1, XQ1, YI1, YQ1, etc.).

Long interleaver 114 may read and/or output, from the memory, one or more words and/or symbols that correspond to the words and/or symbols that were written to the memory. Long interleaver 114 may read the words in a manner that causes the symbols to be in a different order than the order in which the words and/or symbols were written, which may cause additional spreading, smoothing, or averaging of errors among words and/or symbols that do not include errors.

Short interleaver 116 may include one or more components that interleave words and/or symbols received from long interleaver 114. Short interleaver 116 may write the words and/or symbols in a memory associated with short interleaver 116. Short interleaver 116 may read, from the memory, the symbols and/or samples, associated with the symbols, in a different order than the order in which the symbols were stored, which may cause additional spreading, smoothing, or averaging of errors among the symbols and/or samples when the symbols and/or samples are decoded by optical receiver 120.

Coherent encoder 118 may include one or more components that provide encoding of symbols and/or samples received from short interleaver 116. For example, coherent encoder 118 may insert known symbols into a block of symbols (e.g., 32 symbols, 64 symbols, etc.) that are received from short interleaver 116. The known symbols may be associated with a known phase, polarization, component (I and/or Q), etc. that may allow optical receiver 120 to identify errors within a block of symbols. Coherent encoder 118 may generate an encoded block of symbols that includes data symbols (e.g., received from short interleaver 116) and the known symbols (e.g., the inserted symbols). Coherent encoder 118 may output the encoded block of symbols to transmitter 119.

Transmitter 119 may include one or more components that generate and/or transmit an optical signal. Transmitter 119 may generate an optical signal based on the symbols and/or samples received from coherent encoder 118. Transmitter 119 may, in an example implementation, include a laser that generates an optical signal. Additionally, or alternatively, transmitter 119 may include a modulator that modulates the optical signal based on an input electrical signal (e.g., the symbols and/or words received from coherent encoder 118). In one example, transmitter 119 may modulate the optical signal using phase-shift keying (PSK) phase modulation techniques. Additionally, or alternatively, transmitter 119 may include a multiplexer to multiplex the modulated optical signal (e.g., using wavelength-division multiplexing) for transmission to optical transmitter 120. The optical signal, output by transmitter 119, may include a stream of symbols. Each symbol may include one or more bits that correspond to payload data and/or information used for error correction. Each symbol may represent a respective polarization (e.g., a transverse magnetic (TM) (hereinafter referred to as Y-polarization), transverse electric (TE) (hereinafter referred to as X-polarization)), a quadrature component (Q), an in-phase component (I), etc.

Optical receiver 120 may include one or more devices that receive optical signals, process the optical signals, convert the optical signals to electrical signals, perform processing on the electrical signals, and/or output the processed electrical signals to a client device. In an example implementation, optical receiver 120 may be a network device. Optical receiver 120 may include a receiver 121, a digital signal processing (DSP) component 122, a coherent decoder 124, a short interleaver 126, a long interleaver 128, a FEC decoder 130, and a client interface 132. Coherent decoder 124, short interleaver 126, long interleaver 128, a FEC decoder 130 may be arranged, within optical receiver 120, in an order that is reversed relative to FEC encoder 112, long interleaver 114, short interleaver 116, and coherent encoder 118 associated with optical transmitter 110. The reverse order allows the original signal to be reconstructed by reassembling the symbols in an order in which the symbols were received, by client interface 111, from the client device. Optical receiver 120 may receive a signal from optical transmitter 110. The signal may include a quantity of noise (e.g., phase noise and/or some other type of noise) that is acquired from various sources during transit from optical transmitter 110, via the network 140, to optical receiver 120. Optical receiver 121 may process the signal for distribution to a client device.

Receiver 121 may include one or more components that receive, convert, process, amplify, and/or demodulate signals in a manner described herein. Receiver 121 may include a photo detector (e.g., a photo diode) that receives an optical signal. Additionally or alternatively, receiver 121 may include a de-multiplexer (demux) that de-multiplexes the signal (e.g., using wave-division de-multiplexing) into one or more optical signals for processing. In an example implementation, receiver 121 may be a coherent optical receiver that receives and/or processes a phase-modulated optical signal. Optical receiver 120 may, for example, process the signal to break the optical signal into constituent components based on polarization components (e.g. X and Y-polarizations), real and/or imaginary components (e.g., I and/or Q, respectively), etc. Optical receiver 120 may demodulate the components to create electrical signals and may convert the electrical signals from analog signals to digital signals. Optical receiver 120 may output the components as digital electrical signals.

DSP component 122 may include one or more components that receive, process, equalize, and/or perform carrier recovery on digital electrical signals. In an example implementation, DSP component 122 may include an equalizer component that amplifies or attenuates particular frequencies associated with received signals to preserve and/or reshape a wave form associated with a received signal. DSP component 112 may also, or alternatively, include a component that performs carrier recovery operations on the received signals to identify and/or track phase noise associated with the received signals. The carrier recovery operation may, however, cause cycle slips to occur in the signal, which may cause all or a portion of a block of symbols, associated with the signal, to become corrupted with errors (e.g., bit errors, symbols errors, etc.). DSP component 122 may output a stream of symbols and/or samples associated with the symbols. In one example, the stream of symbols and/or samples may be outputted on one or more different channels (e.g., associated with an X-polarization, a Y-polarization, an I component, a Q component, etc.).

Coherent decoder 124 may include one or more components that provide decoding of symbols and/or samples received from DSP component 122. For example, coherent decoder 124 may remove the known symbols and/or samples (e.g., inserted by coherent encoder 118) from a block of symbols (e.g., that includes data symbols, control symbols, etc.) obtained from the signal. Coherent decoder 124 may use one or more reference symbols, that correspond to known quantities of phase, to identify a quantity of phase noise associated with each of the control symbols. Based on the identified quantity of phase noise, coherent decoder 124 may correct, or reset, the phase associated with the data symbols and/or samples associated with the block. Resetting the phase may reduce a quantity of errors associated with the block of symbols. However, if the identified quantity of phase noise corresponds to a particular quantity of phase noise (e.g., 90°, 180°, 270°, etc. associated with QPSK symbols, etc.), then resetting the phase may cause bit errors to occur within the block of symbols. Coherent decoder 124 may output the data symbols and/or samples associated with the reset phase.

Short interleaver 126 may include one or more components that interleave symbols and/or samples received from coherent decoder 124. Short interleaver 126 may perform read-write operations on the symbols and/or samples that have the effect of reversing (e.g., de-interleaving) the interleaver operations performed on the symbols and/or samples by short interleaver 116. Thus, short interleaver 126 may use a memory that is configured in a manner similar to the memory of short interleaver 116. Reversing the interleaver operations may be performed as a step toward rearranging the symbols and/or samples in an original order that allows the signal, received by optical transmitter 110 from the client device, to be reconstructed.

Long interleaver 128 may include one or more components that interleave symbols and/or words received from short interleaver 126. Long interleaver 128 may perform read-write operations on the symbols and/or words that have the effect of reversing (e.g., de-interleaving) the interleaver operations performed on the symbols and/or words by long interleaver 114. Thus, long interleaver 128 may use a memory that is configured in a manner similar to the memory of long interleaver 114. Reversing the interleaver operations may be performed as a step toward rearranging the symbols and/or words in an original order that allows the signal, received by optical transmitter 110 from the client device, to be reconstructed.

FEC decoder 130 may include one or more components that provide encoding of a signal, received from long interleaver 128, that allows errors, within the signal, to be identified and/or corrected. FEC decoder 130 may perform read-write operations on the words and/or symbols in a manner that reverses the read-write operations performed, on the symbols, by FEC encoder 112. Reversing the read-write operations on the symbols may cause the symbols to be returned to a contiguous order that allows the signal, received by optical transmitter 110 from the client device, to be reconstructed. Thus, a memory, associated with FEC decoder 130 and with which the read-write operations are performed, may be configured in a manner that is similar to the memory associated with FEC encoder 112.

Additionally, or alternatively, FEC decoder 130 may perform error correction operations using an error correction code (ECC) (e.g., a Bose, Ray-Chaudhuri, and Hocquenghem (BCH) code, or some other ECC) associated with the ECC code used by FEC encoder 112. FEC decoder 130 may output the symbols in the contiguous order in which the symbols were received by optical transmitter 110.

Interface 132 may include one or more components that are capable of receiving electrical signals and/or outputting electrical signals in a particular format, data rate, bandwidth, etc. For example, interface 132 may receive, FEC decoder 130, an electrical signal (e.g., that includes the symbols and/or words) associated with a third format, data rate, bandwidth, etc. and may transmit the electrical signals to a destination device based on a fourth format, data rate, bandwidth, etc.

Network 140 may include one or more fiber optic-based networks (e.g., such as a fiber plant that provides long haul transmission of optical signals), and/or a combination of the fiber optic networks and other types of networks, such as a wired and/or wireless network.

The quantity of devices, components, and/or networks, illustrated in FIG. 1, is provided for explanatory purposes. In practice, there may be additional devices, components, and/or networks; fewer devices, components, and/or networks; different devices, components, and/or networks; or differently arranged devices, components, and/or networks than illustrated in FIG. 1. Also, in some implementations, one or more of the devices, components, and/or networks of environment 100 may perform one or more functions described as being performed by another one or more of the devices, components, and/or networks of environment 100.

Figure 2:
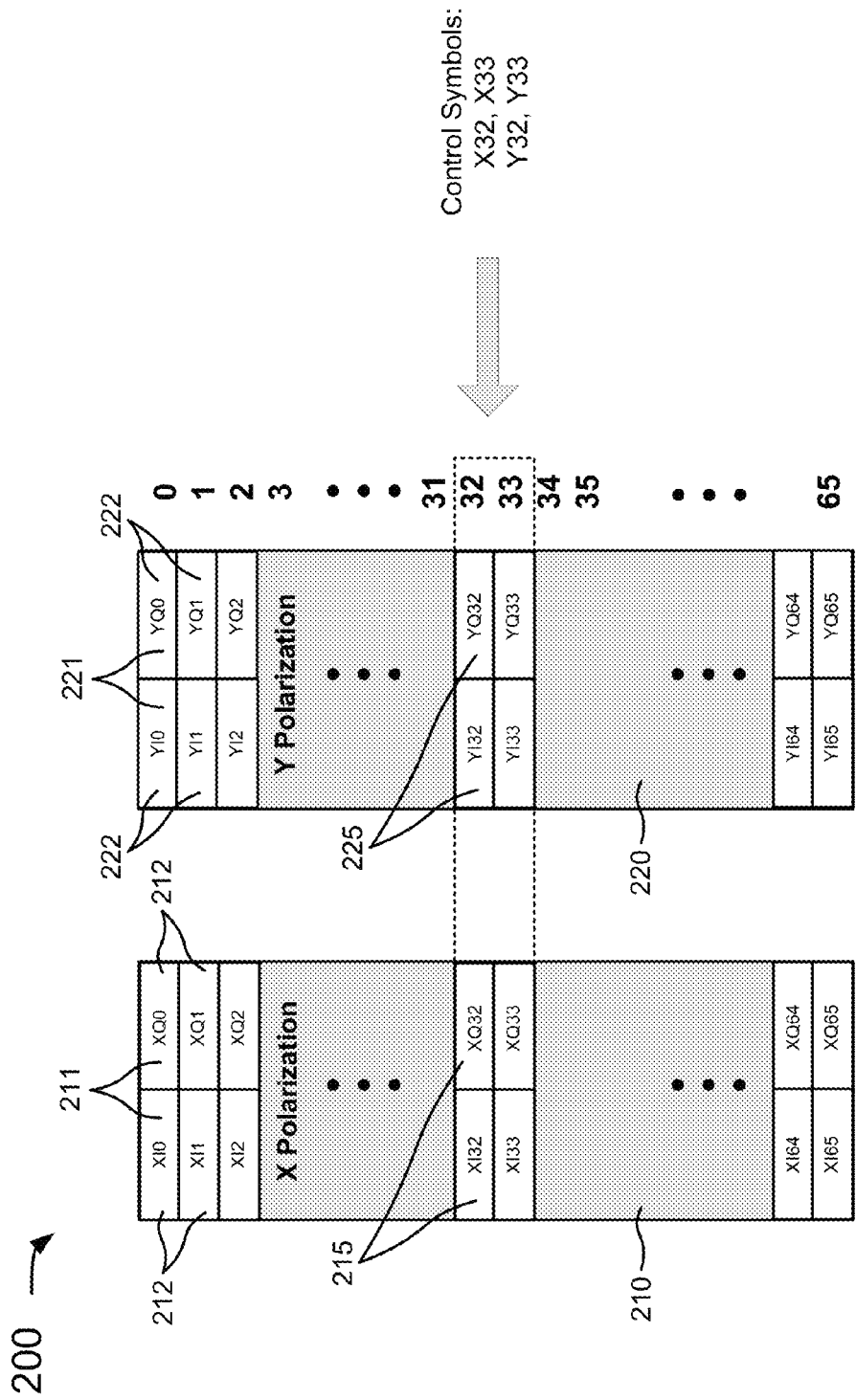
FIG. 2 is a diagram of an example data block that stores phase modulated symbols, according to an implementation described herein.

FIG. 2 is a diagram of an example data block 200 (hereinafter referred to as "block 200") that stores phase modulated symbols, according to an implementation described herein. Block 200 may correspond to a data structure that is generated by coherent encoder 118. As shown in FIG. 2, block 200 may include an X-polarization block 210 and a Y-polarization block 220. X-polarization block 210 may include a group of fields that store data symbols 211, data samples 212 and control symbols 215. Data symbols 211, data samples 212, and/or control symbols 215 may be associated with a first polarization (e.g., an X-polarization). Y-polarization block 220 may include a group of fields that store data symbols 221, data samples 222, and control symbols 225. Data symbols 221, data samples 222, and/or control symbols 225 may be associated with a second polarization (e.g., a Y-polarization).

The discussion below refers to data block 200 in a context associated with a QPSK phase modulation scheme for explanatory purposes. In practice, data block 200 may store symbols associated with phase modulation schemes other than QPSK (e.g., BPSK, etc.). Additionally, or alternatively, X-polarization block 210 and Y-polarization block 220 are described below as each having 66 fields (e.g., 64 fields each for data symbols 211 and data symbols 221 and two fields each for control symbols 215 and control symbols 225) for explanatory purposes. In practice, X-polarization block 210 and/or Y-polarization block 220 may include additional fields, fewer fields, different fields, or differently arranged fields than that shown in FIG. 2.

Data symbols 211 may include symbols that correspond to a payload portion of a signal transmitted by optical transmitter 110. Data symbols 211 may represent phase modulated symbols (e.g., such as 1+j, 1−j, −1−j, and/or −1+j for QPSK symbols, where j represents an imaginary part). Data symbols 211, associated with the first polarization, may include a pair of data samples 212. One data sample 212 may correspond to a real in-phase component (e.g., XI0, XI1, etc.) and/or a second data sample 212 may correspond to an imaginary quadrature component (e.g., XQ0, XQ1, etc.). Thus, data symbol 211 (e.g., X0) may be represented by a complex value that includes a first data sample 212 (e.g., XI0) associated with the in-phase component and a second data sample 212 (e.g., XQ0) associated with the quadrature component (e.g., X0=XI0+j*XQ0). Data symbols 211 may be stored, within block 210, such that data samples 212, associated with the in-phase component, are stored within a first column of fields associated with block 210 and data samples 212, associated with the quadrature component, are stored within a second column of fields associated with block 210.

In a manner similar to that described above with respect to data symbols 211, data symbols 221 may correspond to a payload portion of the signal transmitted by optical transmitter 110. Data symbols 221, associated with the second polarization, may include a pair of data samples 222. One data sample 222 may correspond to a real in-phase component (e.g., YI0, YI1, etc.) and/or a second data sample 222 may correspond to an imaginary quadrature component (e.g., YQ0, YQ1, etc.). Thus, data symbol 221 (e.g., Y0) may be represented by a complex value that includes a first data sample 222 (e.g., YI0) associated with the in-phase component and a second data sample 222 (e.g., YQ0) associated with the quadrature component (e.g., Y0=YI0+j*YQ0). Data symbols 221 may be stored, within block 210, such that data samples 222, associated with the in-phase component, are stored within a first column of fields associated with block 220 and data samples 222, associated with the quadrature component, are stored within a second column of fields associated with block 220.

Control symbols 215 and control symbols 225 may represent QPSK symbols that are inserted, by coherent encoder 118, into block 210 and block 220, respectively. Each of control symbols 215 and control symbols 225 may correspond to a respective known phase (hereinafter referred to as a "reference phase"). Control symbols 215 and/or control symbols 225 may, therefore, be used, by coherent decoder 124, to identify an amount of phase noise associated with data symbols 211 and/or data symbols 221. Identifying the amount of phase noise may allow coherent decoder 124 to reset the phase associated with data symbols 211 and/or data symbols 221, which may reduce errors associated with block 200. If, however, a cycle slip occurs, resetting the phase may cause bit errors to occur within all or a portion of block 200.

Control symbols 215 and/or control symbols 225 may, in one example, be inserted at approximately a mid-point of block 200 (e.g., associated with fields 32 and 33 of fields 0 through 65 of data block 200). Inserting control symbols 215 and/or control symbols 225 at the mid-point of block 200 may confine the errors (e.g., bit errors, symbol errors, etc.) to only one half of block 200 (e.g., the 32 data symbols 211 and/or data symbols 221, within block 200, before or after control symbols 215 and/or control symbols 225). In another example, if control symbols 215 and/or control symbols 225 are inserted at either end of block 200 (e.g., at or near fields 0 and 1, or fields 64 and 65 of block 200), then bit errors may be more likely to occur in all or most of data symbols 211 and/or data symbols 221 within data block 210 and/or data block 220, respectively. Thus, the case where control symbols 215 and/or control symbols 225 are inserted at approximately the mid-way point, of block 200, may generally result in a lowest error rate.

Control symbols 215 and/or control symbols 225 may not correspond to a payload of the signal, and thus, may introduce a processing overhead based on a quantity of control symbols 215 and/or control symbols 225 relative to a quantity of data symbols 211 and/or data symbols 221, respectively. For example, if 64 data symbols 211 and two control symbols 215 are stored in X-polarization block 210, then an overhead penalty of 3.125% may result.

Figure 3:
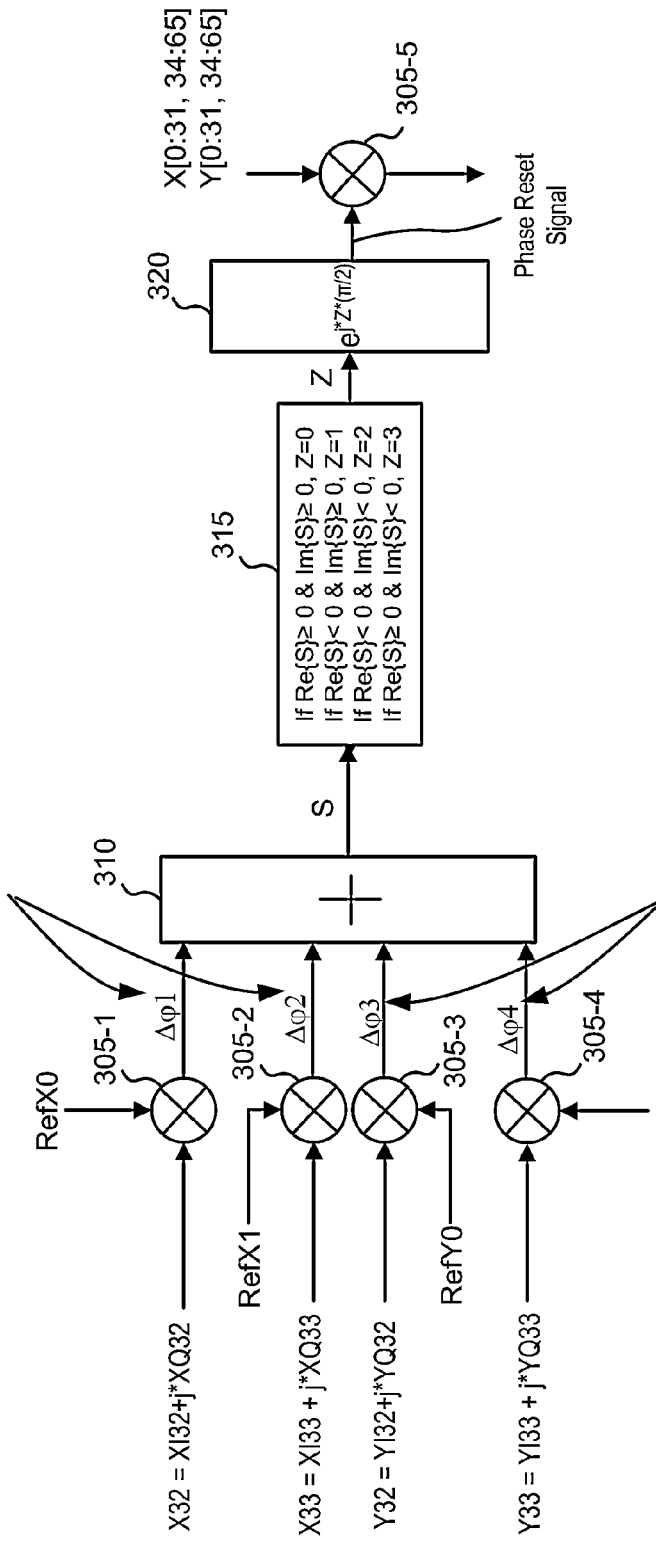
FIG. 3 is a diagram of example components of a coherent decoder of FIG. 1.

FIG. 3 is a diagram of example components of a coherent decoder 124. Coherent decoder 124 may include a group of multipliers 305-1, . . . , 305-5 (hereinafter referred to collectively as "multipliers 305" and individually as "multiplier 305"), an averaging component 310, a decision component 315, and a phase generator 320. The quantity of components, illustrated in FIG. 3, is provided for explanatory purposes. In practice, there may be additional components, fewer components, different components, or differently arranged components that than shown in FIG. 3.

Multiplier 305 may include one or more components that are capable of receiving, processing, and/or combining two or more signals. Multiplier 305 may receive two or more signals and may combine the two or more signals into a combined signal that is outputted to summing component 310. Multiplier 305 may combine the signals by multiplying one of the signals by another one of the signals to create the combined signal.

For example, multiplier 305-1 may multiply a first control symbol 215 (e.g. X32=XI32+j*XQ32), associated with a first polarization (e.g., X-polarization), by a first reference signal (e.g., RefX0). The first reference signal may correspond to the first polarization and may be a complex signal having a known phase (e.g., represented by a complex value, such as 1+j, or some other complex value), to create a first noise signal (e.g., $\Delta\phi1$, where $\Delta\phi1$=RefX0*X32). The first noise signal may be a complex signal (e.g., $\Delta\phi1$=Re{$\Delta\phi1$}+j*Im{$\Delta\phi1$}, where Re{$\Delta\phi1$} represents a real part and Im{$\Delta\phi1$} represents an imaginary part of the first noise signal). The real part, of the first noise signal, may be represented as a difference between a first product of the real parts of the first control symbol 215 and first reference signal a second product of the imaginary parts of the first control symbol 215 and the first reference signal (e.g., Re{$\Delta\phi1$}=Re{X32}*Re{RefX0}−Im{X32}*Im{RefX0}). The imaginary part, of the first noise signal, may be based on a sum of a third product of the real part of the first control symbol 215 and the imaginary part of the first reference signal and a fourth product of the imaginary part of the first control symbol 215 and the real part of the first reference signal (e.g., Im{$\Delta\phi1$}=Re{X32}*Im{RefX0}+Im{X32}*Re{RefX0}).

The first reference signal may correspond to a reference signal used, by coherent encoder 118, to encode data symbols 211 and/or first control symbol 215 associated with the first polarization. In one example, the first reference signal may represent a complex conjugate (e.g., 1−j) of the reference signal used by coherent encoder 118. The first phase noise signal may represent an estimate of an amount of phase noise associated with the first control symbol 215.

Additionally, or alternatively, multiplier 305-2 may multiply a second control symbol 215 (e.g., X33=XI33+j*XQ33), associated with the first polarization, by a second reference signal (e.g., RefX1). The second reference signal may correspond to the first polarization and may be a complex signal having another known phase (e.g., represented by a complex value, such as −1−j, or some other complex value), to create a second noise signal (e.g., $\Delta\phi2$, where $\Delta\phi2$=RefX1*X33). The second noise signal may, in a manner similar to that described above with respect to the first noise signal, be a complex signal (e.g., $\Delta\phi2$=Re{$\Delta\phi2$}+j*Im{$\Delta\phi2$}). The second reference signal may correspond to another reference signal used, by coherent encoder 118, to encode data symbols 211 and/or the second control symbol 215 associated with the first polarization. In one example, the second reference signal may represent a complex conjugate (e.g., −1+j) of the other reference signal used by coherent encoder 118. The second phase noise signal may represent an estimate of an amount of phase noise associated with the second control symbol 215.

Multipliers 305-3 and 305-4 may, in manner similar to that described above with respect to the first polarization, create third and fourth noise signals (e.g., $\Delta\phi3$ and $\Delta\phi4$, respectively) that identify a respective quantity of phase noise associated with a third control symbol 225 (e.g., Y32) and a fourth control symbol 225 (e.g., Y33), respectively.

Averaging component 310 may include one or more components that are capable of receiving, processing, summing, and/or averaging two or more signals. Averaging component 310 may, for example, receive, from multipliers 305 (e.g., multipliers 305-1-305-4), the first noise signal, the second noise signal, the third noise signal, and/or the fourth noise signal. Averaging component 310 may average the noise signals and may output an average noise signal (e.g., S) that represents an average noise associated with the first control symbol 215, second control symbol 215, the third control symbol 225, and the fourth control symbol 225. The average noise signal may be a complex signal (e.g., S=Re{S}+j*Im{S}).

In another example implementation, averaging component 310 may generate a first noise signal (e.g., S1) associated with the first polarization and a second noise signal (e.g., S2) associated with the second polarization. The first noise signal may represent an average phase noise between the first control symbol 215 (e.g., X32) and the second control symbol 215 (e.g., X33). The second noise signal may represent an average phase noise between the third control symbol 215 (e.g., Y32) and the fourth control symbol 215 (e.g., Y33).

In yet another example implementation, averaging component may generate a third noise signal (e.g., S3) that represents an average quantity of phase noise associated with the real portions of control symbols 215 and control symbols 225 (e.g., XI32, XI33, YI32, and YI33) and/or a fourth noise signal (e.g., S4) that represents an average quantity of phase noise associated with the imaginary components of control symbols 215 and control symbols 225 (e.g., XQ32, XQ33, YQ32, and YQ33).

Decision component 315 may include one or more components that are capable of receiving and/or processing a signal, and/or outputting a value based on characteristics of the received signal. For example, decision component 315 may receive the average noise signal from averaging component 310. Decision component 315 may identify a phase associated with the average noise signal that represents an average quantity of noise associated with the control symbols 215 and control symbols 225. Decision component 315 may output a first value (e.g., Z=0 or some other value) based on a determination that the average noise signal includes a real component (e.g., Re{S}) that is greater than or equal to zero and an imaginary component (e.g., Im{S}) that is greater than or equal to zero.

Decision component 315 may output a second value (e.g., Z=1 or some other value) based on a determination that the average noise signal includes a real component that is not greater than or equal to zero and an imaginary component that is greater than or equal to zero. Decision component 315 may output a third value (e.g., Z=2 or some other value) based on a determination that the average noise signal includes a real component that is not greater than or equal to zero and an imaginary component that is not greater than or equal to zero. Decision component 315 may output a fourth value (e.g., Z=3 or some other value) based on a determination that the average noise signal includes a real component that is greater than or equal to zero and an imaginary component that is not greater than or equal to zero.

Phase generator 320 may include one or more components that are capable of modulating a signal received from transmitter decision component 315. For example, phase generator 320 may receive, from decision component 315, a signal that corresponds to a particular value (e.g., Z=0, 1, 2, 3, or some other value). Phase generator 320 may generate a reference signal associated with a known phase (e.g., a known phase, such as $e^{j*z*(\pi/2)}$), that depends on the particular value and which can be used to reset a phase associated with data symbols 211 and/or data symbols 221. For example, if the received signal corresponds to a first value, phase generator 320 may transmit a reset signal associated with a first reference phase (e.g. $e^0$, or some other phase, when Z=0). In another example, if the received signal corresponds to a second value, phase generator 320 may transmit a reset signal associated with a second reference phase (e.g., $e^{j*(\pi/2)}$, or some other phase, when Z=1). In yet another example, if the received signal corresponds to a third value, phase generator 320 may transmit a reset signal associated with a third reference phase (e.g. $e^{j*(\pi)}$, or some other phase, when Z=2). In a further example, if the received signal corresponds to a fourth value, phase generator 320 may transmit a reset signal associated with a fourth reference phase (e.g. $e^{j*(\pi/2)}$, or some other phase, when Z=3).

Multiplier 305-5 may receive the reset signal and may multiply data symbols 211 and/or data symbols 221 by the reset signal to reset a phase associated with the data symbols 211 and/or data symbols 221. In another example implementation, multiplier 305-5 may use a different signal to reset a respective phase associated with data symbols 211 and data symbols 221. For example, multiplier 305-5 may reset data symbols 211 using a first reset signal, received from phase generator 320 (e.g. based on a first noise signal, S1), that corresponds to the first polarization. In another example, multiplier 305-5 may reset data symbols 221 using a second reset signal, received from phase generator 320 (e.g. based on a second noise signal, S2), that corresponds to the second polarization.

Figure 4:
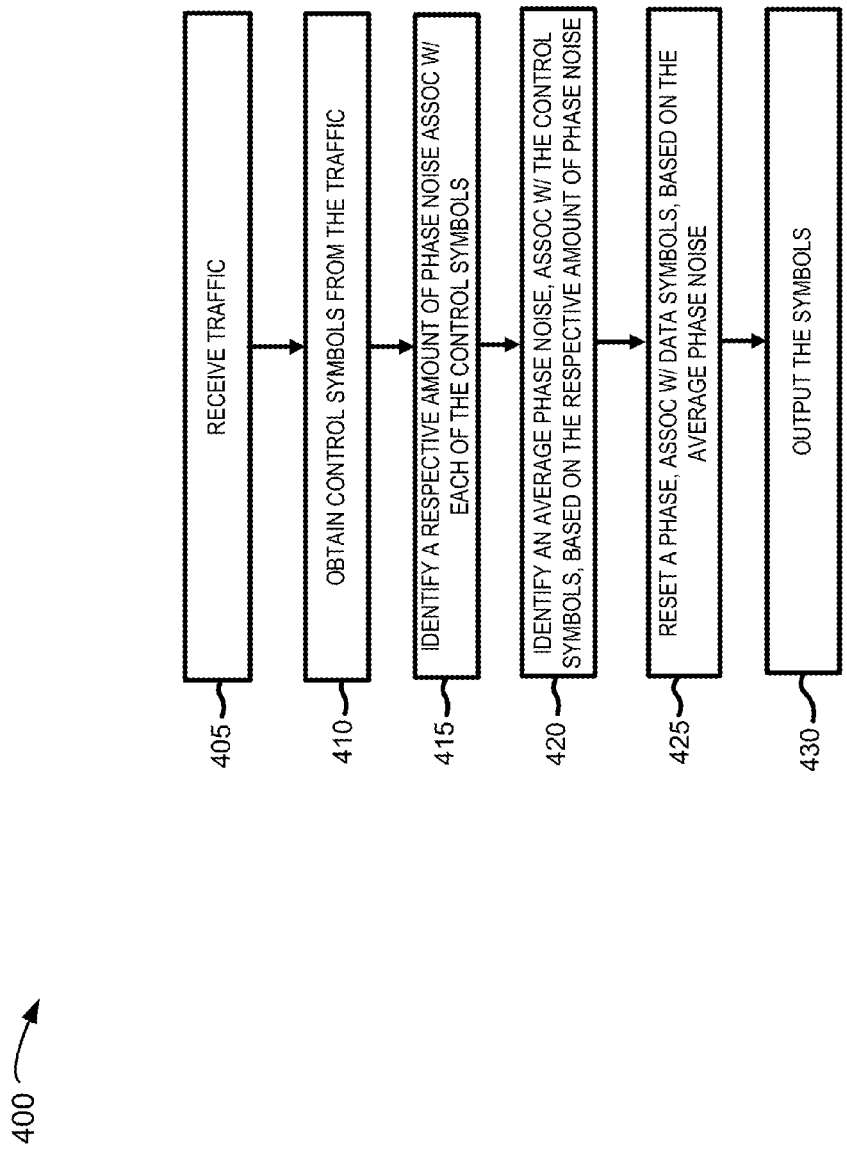
FIG. 4 is a flow chart of an example process for decoding symbols associated with received traffic, according to an implementation described herein.

FIG. 4 is a flow chart of an example process 400 for decoding symbols, associated with received traffic, according to an implementation described herein. In one example implementation, process 400 may be performed by coherent decoder 124. In another example implementation, some or all of process 400 may be performed by a device or collection of devices separate from, or in combination with, coherent decoder 124.

As shown in FIG. 4, process 400 may include receiving traffic (block 405) and obtaining control symbols from the traffic (block 410). For example, coherent decoder 124 may receive, from DSP component 122, traffic that was received, by optical receiver 120, from optical transmitter 110. The traffic may include one or more data blocks 200. Coherent decoder 124 may obtain, from data block 200, control symbols 215 and/or control symbols 225. In one example, control symbols 215 and/or control symbols 225 may be removed from a particular location within data block 200 (e.g., a midpoint within data block 200, such as fields 32 and/or 33 of X-polarization field 210 and Y-polarization field 220, respectively). In another example implementation, control symbols 215 and/or control symbols 225 may be removed from a point, within data block 200, that is different than the midpoint.

Coherent decoder 124 may, in one example, receive a stream of data symbols 211 and/or data symbols 221 and may use a framing technique to determine which data symbols 211, data symbols 221, control symbols 215 and/or control symbols 225 are associated with a particular frame. A frame, may, for example, be calibrated to correspond to a configuration associated with data block 200 (e.g., 64 data symbols and/or 2 control symbols per polarization, locations of control symbols, etc.). Coherent decoder 124 may identify one or more positions, within a frame of symbols associated with the stream, that corresponds to control symbols 215 and/or control symbols 225 and may remove control symbols 215 and/or control symbols 225 from the stream based on the identified positions, As also shown in FIG. 4, process 400 may include identifying a respective amount of phase noise associated with each of the control symbols (block 415). For example, coherent decoder 124 may, in a manner similar to that described above with respect to FIG. 3, identify a respective quantity of phase noise, associated with control symbols 215 (e.g., XI and/or XQ) and/or control symbols 225 (e.g., YI and/or YQ). Coherent decoder 124 may identify one or more reference signals (e.g., RefX0, RefX1, RefY0, and/or RefY1) with which to multiply control symbols 215 and/or 225 (e.g., XI*RefX0, XQ*RefX1, etc.) to identify a respective quantity of phase noise (e.g., Δϕ1, Δϕ2, Δϕ3, and/or Δϕ4) associated with each of control symbols 215 and/or control symbols 225.

As further shown in FIG. 4, process 400 may include identifying an average phase noise, associated with the control symbols, based on the respective amount of phase noise (block 420), resetting a phase, associated with data symbols, based on the average phase noise (block 425), and outputting the symbols (block 430). For example, coherent decoder 124 may, in a manner similar to that described above with respect to FIG. 3, identify an average phase noise associated with control symbols 215 and control symbols 225 by identifying an average of the respective quantity of phase noise (e.g., Δϕ1, Δϕ2, Δϕ3, and/or Δϕ4) associated with each of control symbols 215 and/or control symbols 225. Coherent decoder 124 may generate an average noise signal (e.g., S) based on the average phase noise associated with control symbols 215 and control symbols 225.

Coherent decoder 124 may, in a manner similar to that described above with respect to FIG. 3, generate a value based on characteristics associated with a real and/or imaginary component of the average noise signal. For example, if the average noise signal indicates that the phase noise falls within a first range of phase noise (e.g., between 0 and 90 degrees, when Re{S}≥0 and Im{S}≥0), then coherent decoder 124 may reset data symbols 211 and/or data symbols 221 to a first phase (e.g., 0 degrees or some other phase). In another example, if the average noise signal indicates that the phase noise falls within a second range of phase noise (e.g., between 90 and 180 degrees, when Re{S}<0 and Im{S}≥0), then coherent decoder 124 may reset data symbols 211 and/or data symbols 221 to a second phase (e.g., 90 degrees or some other phase). In yet another example, if the average noise signal indicates that the phase noise falls within a third range of phase noise (e.g., between 180 and 270 degrees, when Re{S}<0 and Im{S}<0), then coherent decoder 124 may reset data symbols 211 and/or data symbols 221 to a third phase (e.g., 180 degrees or some other phase). In still another example, if the average noise signal indicates that the phase noise falls within a fourth range of phase noise (e.g., between 270 and 360 degrees), when Re{S}≥0 and Im{S}<0), then coherent decoder 124 may reset data symbols 211 and/or data symbols 221 to a fourth phase (e.g., 270 degrees or some other phase). Coherent decoder 124 may output reset data symbols 211 and/or data symbols 221 to short interleaver 126.

Figure 5:
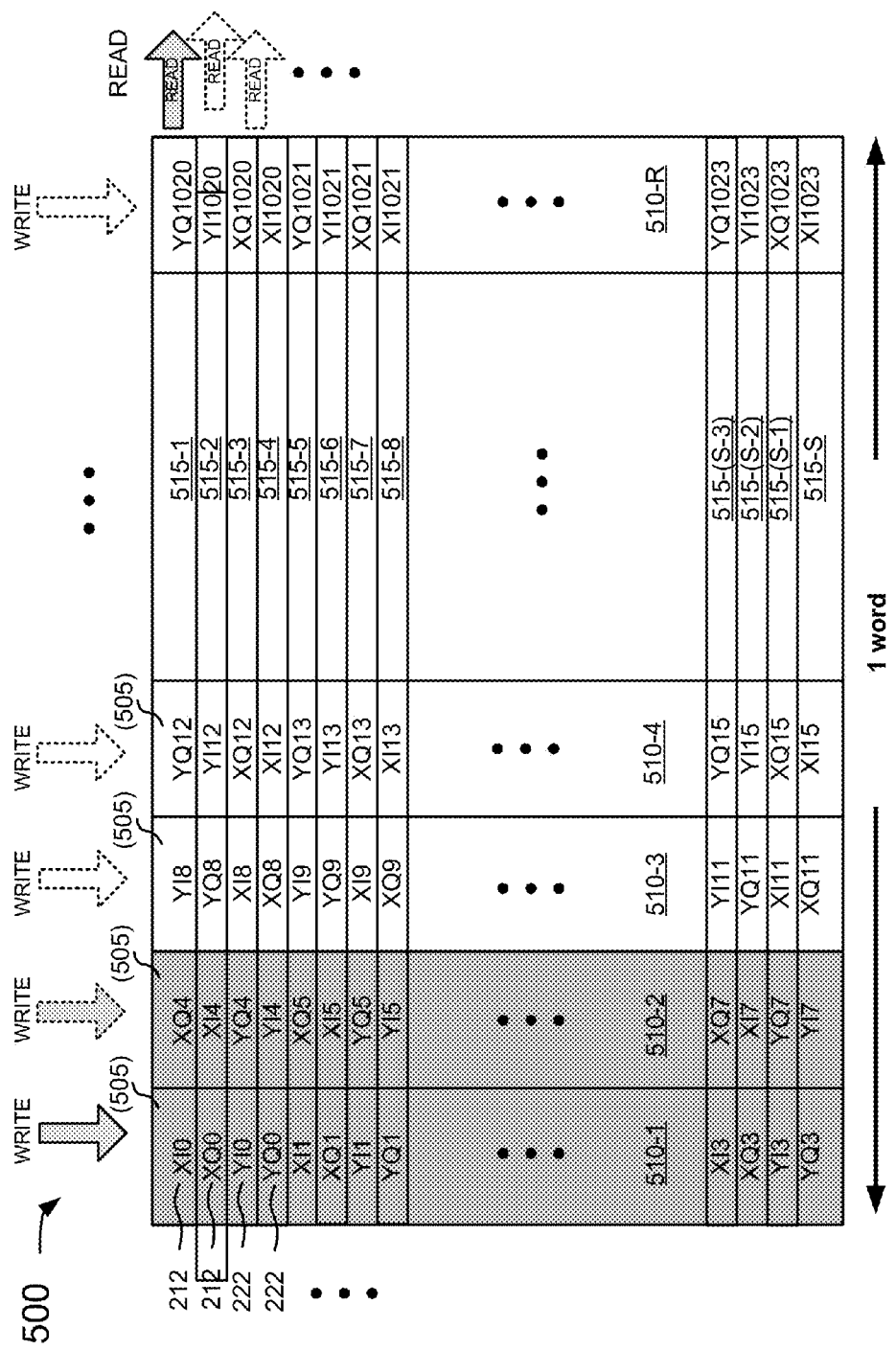
FIG. 5 is a diagram of example short interleaver data structure associated with a short interleaver of FIG. 1, according to an implementation described herein.

FIG. 5 is a diagram of example short interleaver data structure 500 (hereinafter referred to as "data structure 500") associated with short interleaver 126, according to an implementation described herein. Data structure 500 may be stored in a memory associated with short interleaver 126. Data structure 500 may include a group of fields 505, a group of columns 510-1, . . . , 510-R (where R≥1) (hereinafter collectively referred to as "columns 510" and individually as "column 510"), and a group of frames 515-1, . . . 515-S (where S≥1) (hereinafter collectively referred to as "frames 515" and individually as "frame 515"). Data structure 500 includes a quantity of fields, columns, and/or frames for explanatory purposes. In practice, FIG. 5 may include additional fields, columns, and/or frames; fewer fields, columns, and/or frames; different fields, columns, and/or frames; or differently arranged fields, columns, and/or frames than that shown in FIG. 5.

Field 505 may store data sample 212 or data sample 222. Column 510 may store a quantity of fields 505. In one example, column 510 may store fields 505 vertically within data structure 500. Frame 515 may store another quantity of fields 505. In one example, frame 515 may store fields 505 horizontally within data structure 500. Data structure 500 may be sized in a manner that causes data samples 212 and/or data samples 222, associated with data block 200, to be stored in more than one column 510. Additionally, or alternatively, data structure 500 may be sized in a manner that causes data samples 212 and/or data samples 222, associated with data block 200, to be stored in frames 515 in a manner that represents alternating components (e.g., an in-phase component associated with X-polarization, a quadrature component associated with X-polarization, an in-phase component associated with Y-polarization, and a quadrature component associated with Y-polarization).

Short interleaver 126 may write data samples 212 and/or data samples 222, received from coherent decoder 124, in columns 510. Short interleaver 126 may, for example, obtain data samples 212 and/or data samples 222 from a block of data symbols (e.g., data block 200) received from coherent decoder 124. Short interleaver 126 may vertically write (e.g., as shown in the left-most downward pointing arrow) a first pair of data samples 212 (e.g., XI0 and XQ0), associated with a first data symbol 211 (e.g., X0) to a first pair of adjacent fields 505 located at a beginning of a first column 510-1. Short interleaver 126 may vertically write a first pair of data samples 222 (e.g., YI0 and YQ0), associated with a first data symbol 221 (e.g., Y0), in a pair of next available fields 505 associated with the first column 510-1. Storing the first pairs of data samples 212 and data samples 222 may result in the first four fields 505, of the first column 510-1, holding the first pair of data samples 212 and the first pair of data samples 222 (e.g., XI0, XQ0, YI0, and YQ0).

Short interleaver 126 may repeat the process until column 510-1 has reached capacity. Short interleaver 126 may write successive pairs of data samples 212 and/or data samples 222 in next available columns 510-2, 510-3, etc. until all of data samples 212 and/or data samples 222, associated with data block 200, have been stored in data structure 500.

In one example, data structure 500 may be sized to include 256 columns 510 (e.g., when R=256) and/or 16 frames 515 (e.g., when S=16) that can store 4096 data samples (e.g., 2048 data samples 212 and 2048 data samples 222). Data samples 212 and/or data samples 222, associated with data block 200, may be stored in sixteen columns 510, of data structure 500, that include 64 data symbols 211 and 64 data symbols 221 (e.g., a total of 128 symbols or 256 samples). Short interleaver 126 may vertically write data samples 212 and/or data samples 222, associated with other data blocks 200 that are received from coherent decoder 124, in adjacent groups of available columns 510 until data structure 500 has reached capacity. In one example, data structure 500 may store a quantity of data samples 212 and data samples 222 associated with 16 data blocks 200.

Based on a determination that short interleaver 126 has reached capacity, short interleaver 126 may horizontally read (e.g., as shown by the shaded right-pointing arrow), as a first word, data samples 212 and/or data samples 222 (e.g., XI0, XQ4, YI8, YQ12, . . . , YQ1020) from a first frame 515-1 of data structure 500. Each adjacent data symbol 212 and/or data symbol 222, within the first word, may correspond to a different component of the signal and/or channels via which the signal is being transported, such as an in-phase component associated with a first polarization (e.g., XI0), a quadrature component associated with the first component (e.g., XQ4), an in-phase component associated with a second polarization (e.g., YI8), a quadrature component associated with the second polarization (e.g., YQ12), etc. Short interleaver 126 may continue to read words from a next adjacent frame 515 (e.g., 515-2, 515-3, etc.), until all frames 515 have been read from data structure 500. Reading the words from data structure 500 may cause errors, associated with the first and second columns 510 (e.g., as shown by shaded columns 510-1 and 510-2), to be spread out and/or averaged across the first two samples of each word.

Data blocks 200 may be written to short interleaver 126 in a manner in which data blocks 200 are read from short interleaver 116 to be outputted to coherent encoder 118. Additionally, or alternatively, words may be read from short interleaver 126 in a manner in which the words were written by short interleaver 116. Writing data blocks 200 to, and/or reading words from, short interleaver 126 in the manner in which data blocks 200 were read from, and/or the words were written to, short interleaver 116, respectively, may cause the effects of interleaving, by short interleaver 116 to be reversed. Reversing the effects of the interleaving, by short interleaver 116, may allow the original signal, received by interface 111, to be recovered by reassembling data samples 212 and/or data samples 222 in an order in which data symbols 212 and/or data symbols 222 were received.

Figure 6:
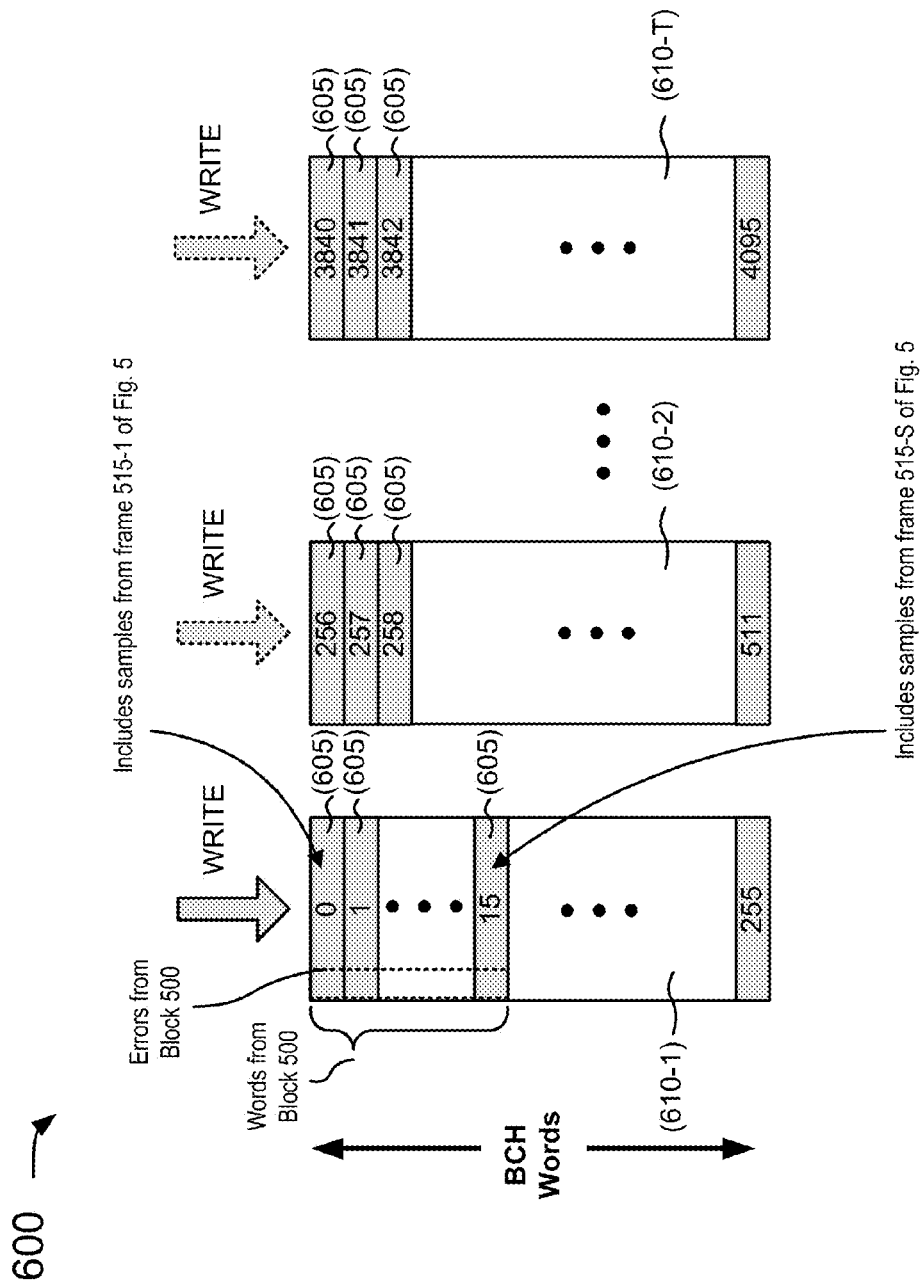
FIG. 6 is a diagram of example long interleaver data structure associated with a long interleaver device of FIG. 1, according to an implementation described herein.

FIG. 6 is a diagram of example long interleaver data structure 600 (hereinafter referred to as "data structure 600") associated with a long interleaver 128, according to an implementation described herein. Data structure 600 may be stored in a memory associated with long interleaver 128. As shown in FIG. 6, data structure 600 may include a group of fields 605 and a group of frames 610-1, . . . , 610-T (where T≥1) (hereinafter referred to collectively as "frames 610" and individually as "frame 610"). Field 605 may store a word that is read from frame 515 and written to field 605. The word may include data samples 212 and/or data samples 222 stored in frame 515.

Long interleaver 128 may receive, from short interleaver 126, words read from frames 515 associated with short interleaver 126. Long interleaver 128 may vertically write (e.g., as shown by the downward pointing arrow) the words, into frames 610, from short interleaver 126. For example, long interleaver 128 may write a first word, read from a first frame 515-1, to a first field 605 within a first frame 610-1. In one example, long interleaver 128 may write data samples, read from the first frame 515-1 (e.g., XI0, XQ4, YI8, YQ12, . . . , YQ1020) as a first word (e.g. labeled as "0") to the first frame 605. Additionally, or alternatively, long interleaver 128 may write a second word (e.g., labeled as "1"), read from a second frame 515-2 (e.g., XQ0, XI4, YQ8, YI12, . . . , YI1020) to a next field 605 within the first frame 610-1. Long interleaver 128 may write all of the words, read from all of frames 515 into consecutive fields 605 of the first frame 610-1.

Long interleaver 128 may obtain other words from frames 515 after short interleaver 126 writes other data blocks 200 to columns 510. Long interleaver 128 may write the other words (e.g., 16-255) to the first frame 610-1 until the first frame 610-1 reaches capacity. Long interleaver 128 may repeat writing words (e.g., as shown by arrows with the dotted lines) until each frame 610 has reached capacity. In one example, data structure 600 may be sized to include 16 frames (e.g. when T=16) that are each capable of storing 256 words (e.g., 16×256=4096 words). Data structure 600 may, in this example, store 16 words (e.g., from data structure 500), of a total capacity of 4096 words, that include samples obtained from data structure 200.

Writing the words to long interleaver 128 may cause a respective portion of errors, that are stored within contiguous fields 505 of first column 510-1 and second column 510-2, to be allocated or spread among each word that is read from frames 515. In one example, the errors may be allocated and/or spread across sixteen words written to frame 610. More particularly, each word may include two errors (e.g., associated with data samples 212 and/or data samples 222) that are allocated and/or spread across sixteen words, each including a large quantity (e.g. 256, 512, 1024, etc.) of data samples 212 and/or data samples 222.

Figure 7:
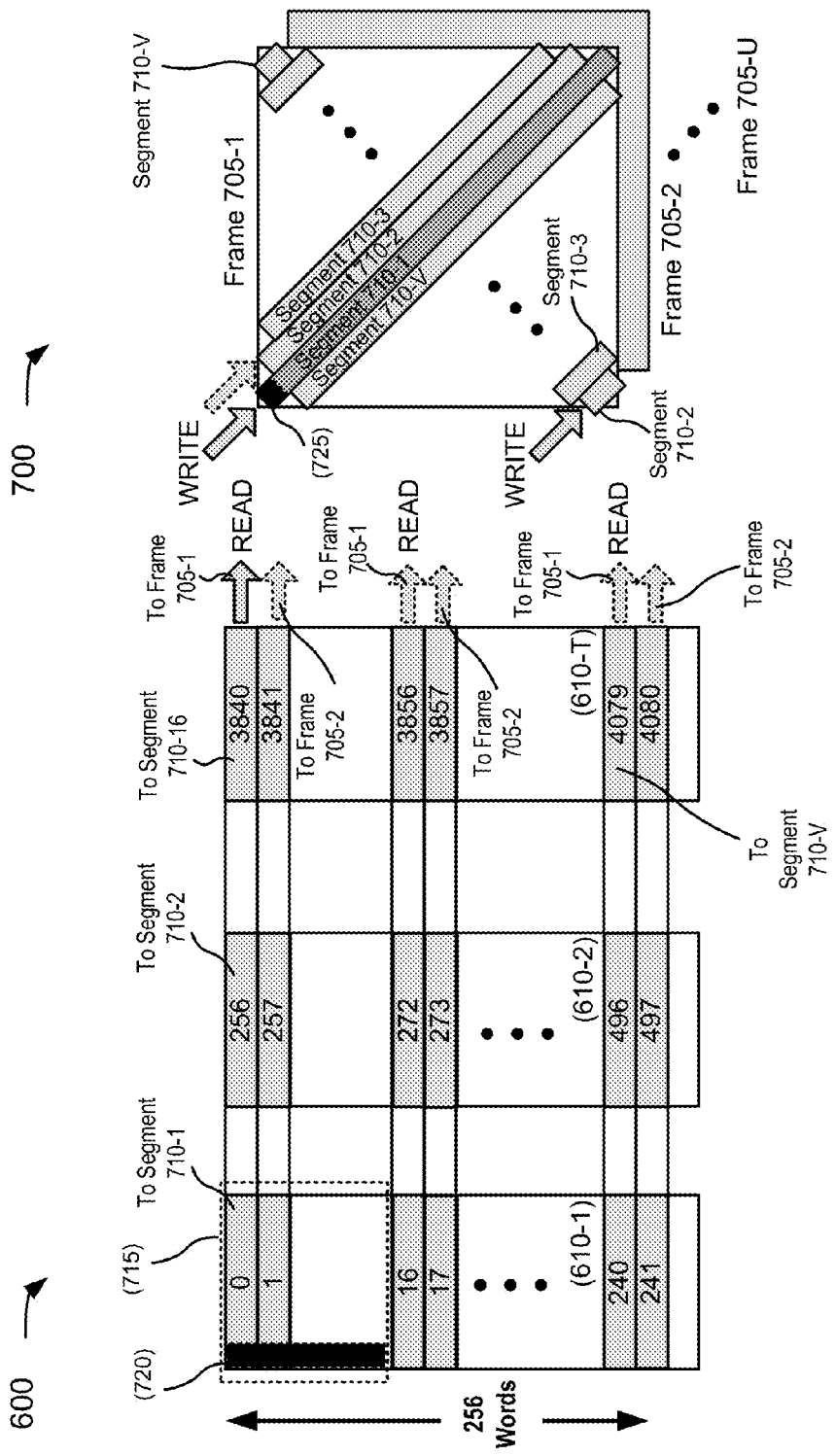
FIG. 7 is a diagram of example forward error correction (FEC) data structure associated with a FEC decoder of FIG. 1, according to an implementation described herein.

FIG. 7 is a diagram of an example FEC data structure 700 interacting with data structure 600, according to an implementation described herein. FEC data structure 700 may be stored in a memory associated with FEC decoder 130. In another example implementation, FEC data structure may be stored in a memory that is not associated with FEC decoder 130. As illustrated in FIG. 7, FEC data structure 700 may include a group of frames 705-1, . . . , 705-U (where U≥1) (hereinafter referred to collectively as "frames 705" and individually as "frame 705"), a group of diagonal segments 710-1, . . . , 710-V (where V≥1) (hereinafter referred to collectively as "segments 710" and individually as "segment 710"). FEC data structure 700 may be stored in a memory associated with FEC decoder 130. Data structure 700 includes a quantity of frames and/or segments for explanatory purposes. In practice, data stricture 700 may include additional frames and/or segments, fewer frames and/or segments, different frames and/or segments, or differently arranged frames and/or segments than that shown in FIG. 7.

Frame 705 may include one or more segments 710 that are arranged, within frame 705, in a diagonal manner. Segment 710 may store one or more words that are read from data structure 600. The words may be horizontally read from a respective field 605, associated with each frame 610, within data structure 600. Each word may be diagonally written to a respective different segment 710.

Long interleaver 128 may horizontally read a group of first words from each frame 610 associated with data structure 600. For example, long interleaver 128 may read a first word (e.g., labeled as "0") from a first field 605 associated with first frame 610-1, a first word (e.g., labeled as "256") from a first field 605 associated with a second frame 610-2, and/or other first words from other first fields 605 associated with other frames 610 (e.g., frames 610-3-610-T). The first word, read from first frame 610-1, may correspond to a first data block 200. The first data block 200 may, in one example, be stored in first frame 610-1 as a first group of words (e.g., words 0-15 as shown by dotted rectangle 715). Each of the first group of words may contain one or more errors (e.g., shown by black rectangle 720).

Long interleaver 128 may output the group of first words (e.g., words labeled as "0," "256," . . . , "3840") to FEC decoder 130. FEC decoder 130 may receive the group of first words and may diagonally write the group of first words to first frame 705-1 associated with data structure 700. For example, FEC decoder 130 may write a first word (labeled as "0") in a first segment 710-1. First segment 710-1 may store one or more errors (e.g. as shown by black square 725). FEC decoder 130 may write a second word (e.g., labeled as "256") to a second segment 710-2. Second segment 710-2 may not store any errors included among samples 212 and/or samples 222 of data block 200 (e.g., as shown by the black square).

Additionally, or alternatively, long interleaver 128 may read a group of second words from second fields 605 associated with each frame 610. For example, long interleaver 128 may read second words (e.g., labeled as "16," "272," . . . , "3856") from second fields 605 associated with frames 610. The group of second words may be non-contiguous with respect to the group of first words that were read from first fields 605. Additionally, or alternatively, the group of second words may be associated with a different data block 200 than the first data block. Reading from second fields 605 that are non-contiguous with respect to the first fields 605 may cause errors, to be spread out within first frame 705-1 and/or among other frames 705 associated with FEC data structured 700. FEC decoder 130 may write each of the second words in other segments 710 within frame 705-1. FEC decoder 130 may continue to horizontally read other groups of words, from non-contiguous fields 605, until frame 705-1 has reached capacity (e.g., when word labeled as "4079" is stored in segment 710-V). Thus, first frame 705-1 may store errors from a portion of only one word (e.g., word "0") that includes samples associated with data structure 200.

In manner similar to that described above, FEC decoder 130 may write, to a segments 710 within second frame 705-2, a second group of words (e.g., labeled as "1," "257," . . . , "3841") that are horizontally read from a fields 605 that are contiguous with the group of first words (e.g., the words labeled as "0," "256," . . . , "3840"). Additionally, or alternatively, FEC decoder 130 may write, to a segments 710 within second frame 705-2, another second group of words (e.g., labeled as "17," "273," . . . , "3857") that are horizontally read from fields 605 that are non-contiguous with the second group of words. Horizontally reading the second group of words or the other second group of words, from fields 605 that are non-contiguous with respect to the first fields 605 that store the first group of words, may cause errors to be spread out within second frame 705-2 and/or among other frames 705 associated with FEC data structured 700. FEC decoder 130 may continue to horizontally read other second groups of words, from non-contiguous fields 605, until second frame 705-2 has reached capacity (e.g., when word labeled as "4080" is stored in segment 710-V). Thus, second frame 705-2 may store errors from a portion of only one word (e.g., word "1") that includes samples associated with data structure 200.

Long interleaver 128 may continue to horizontally read groups of words from non-contiguous rows within data structure 600 until all the words have been read from data structure 600. Long interleaver 128 may output the groups of words to frames 705 until FEC decoder 130 has reached capacity.

In one example, data structure 700 may be sized to include 256 segments 710 (e.g., when V=256) within 16 frames 705 (e.g., when U=16). Sizing data structure 700 to include 256 segments 710 may allow each word, horizontally read from data structure 600, to be stored in 256 segments 710 associated with each of the 16 frames 705. Storing the words within data structure 700 may allow errors, associated with samples within data structure 200, to be spread out among other data samples stored within data structure 700 (e.g., total quantity of samples≅256 samples per word*1 word per segment*256 segments*16 frames≅1,048,576 samples). Words may be written to interleaver 128 in a manner in which words are read from long interleaver 114 or output to short interleaver 116. Additionally, or alternatively, words may be read from long interleaver 128 in a manner in which words are written to long interleaver 114. Writing and/or reading words, from long interleaver 128, in the manner in which the words are read from and/or written to long interleaver 114, respectively, may cause the effects of interleaving, by long interleaver 114 to be reversed. Reversing the effects of the interleaving, by long interleaver 114, may reverse the original signal, received by interface 111, to be recovered by reassembling data samples 212 and/or data samples 222 in an order in which data samples 212 and/or data samples 222 were received.

FEC decoder 130 may vertically and/or horizontal read words, from columns and/or rows associated with FEC data structure 700, respectively, and may perform a forward error correction operation on data samples 212 and/or data samples 222. The words may be written to segments 710 in a manner that corresponds to how words are read from segments within a memory associated with FEC encoder 112. Additionally, or alternatively, the words may be read from the columns and/or rows, in a manner that corresponds to how the words were written to rows and/or columns within the memory associated with FEC encoder 112. Additionally, or alternatively, the manner in which the words are written to segments 710 and/or read from the rows and/or columns may allow the original signal, received by interface 111, to be recovered by reassembling data symbols 211 and/or data symbols 221 in an order in which data symbols 211 or data symbols 221 were received.

FIG. 8 is a flow chart of an example process 800 for performing interleaving and/or FEC operations on traffic, according to an implementation described herein. In one example implementation, process 800 may be performed by one or more devices associated with optical receiver 120. In another example implementation, some or all of process 800 may be performed by one or more devices separate from, or in combination with the devices associated with optical receiver 120.

As shown in FIG. 8, process 800 may include receiving symbols (block 805) and decoding the symbols (block 810). For example, optical receiver 120 may receive a block (e.g., data block 200) of symbols from optical transmitter 110 via network 140. The symbols may include data symbols 211, data symbols 221, control symbols 215 and/or control symbols 225. Optical receiver 120 may, in a manner similar to that described above with respect to process 400 (FIG. 4), use control symbols 215 and/or control symbols 225 to identify a quantity of phase noise associated with data symbols 211 and/or data symbols 221. Based on the quantity of phase noise, optical receiver 120 may identify a reference phase with which to reset a phase associated with data symbols 211 and/or data symbols 221.

As also shown in FIG. 8, process 800 may include writing the samples, obtained from the symbols, to one or more columns within a first memory associated with a short interleaver device (block 815) and reading words from rows within the first memory (block 820). For example, optical receiver may obtain a respective pair of data samples 212 from each data symbol 211 and/or a respective pair of data samples 222 from each data symbol 221. Optical receiver 120 may, in a manner similar to that described above with respect to FIG. 5, vertically write data samples 212 and/or data samples 222 to one or more columns associated with a data structure (e.g., data structure 500) that are stored within a first memory (e.g., associated with short interleaver 126). In one example, pairs of data samples 212 associated with in-phase and/or quadrature components (e.g., XI0 and/or XQ0) and/or pairs of data samples 222, associated with in-phase and/or quadrature components (e.g., YI0 and/or YQ0) may be written to the columns in an alternating manner (e.g., XI0, XQ0, YI0, YQ0, etc.). Optical receiver 120 may continue to vertically write data samples 212 and/or data samples 222, associated with other data blocks 200, to the columns until data structure 500 has reached capacity.

Optical receiver 120 may, in a manner similar to that described above with respect to FIG. 5, horizontally read words, of data samples 212 and/or data samples 222, from rows associated with data structure 500. For example, optical receiver may read a first word from a first row that includes non-contiguous data samples 212 and/or data samples 222 associated with in-phase and/or quadrature components (e.g., XI0, XQ4, YI8, YQ12, etc.). Optical receiver 120 may horizontally read other words, from data structure 500, until all words have been read from data structure 500. Reading data samples 212 and/or data samples 222 in the non-contiguous manner may permit errors, contained within data blocks 200 that were written to the columns, to be spread out over one or more words read from data structure 500.

As further shown in FIG. 8, process 800 may include writing the words to one or more frames within a second memory associated with a long interleaver device (block 825) and reading groups of words from the frames within the second memory (block 830). For example, optical receiver 120 may, in a manner similar to that described above with respect to FIG. 6, vertically write first words (e.g., the words read from rows associated with the first memory) to a first frame associated with a data structure (e.g., data structure 600) that is stored within a second memory (e.g., associated with long interleaver 128). Optical receiver 120 may, in another example, store second words, obtained from the first memory (e.g., after another set of data samples 212 and/or data samples 222 are written to the columns of data structure 500), to the first frame. Optical receiver 120 may continue to store successive words (e.g., third words, fourth words, etc.) in the first frame and/or other frames, within the second memory, until the data structure has reached capacity.

Optical receiver 120 may, in a manner similar to that described above with respect to FIG. 7, horizontally read groups of words from each frame associated with data structure 600. For example, optical receiver 120 may read a first group of words from a respective first field associated with each frame within data structure 600. The first group of words may include a first word associated with first data block 200. Additionally, or alternatively, the first group of words may include other words associated with other data blocks 200. Optical receiver 120 may read a second group of words from a respective second field associated with each frame within data structure 600. The respective second field and/or the second group of words may not be contiguous with the first respective field and/or the first group of words, respectively. For example, a second field, associated with the first frame, may not be contiguous with the first field, associated with the first frame, and/or may store a word that is not associated with the first data block 200.

Optical receiver 120 may horizontally read another group of words, from frames within data structure 600, until all groups of words have been read from data structure 600. Reading the groups of words from the frames associated with data structure 600 in the non-contiguous manner may permit errors, contained within words associated with data block 200 to be spread out over one or more groups of words read from data structure 600. The errors that are spread out among symbols that are include within the one or more group of words may permit an error rate, associated with the errors included within data block 200, to be reduced to a level that is less than a threshold.

As yet further shown in FIG. 8, process 800 may include writing the groups of words to diagonal segments within a third memory associated with a FEC decoder device (block 835), performing forward error correction on samples read from the third memory (block 840), and outputting the symbols based on samples on which the forward error correction was performed (block 845). For example, optical receiver 120 may, in a manner similar to that described above with respect to FIG. 7, diagonally write a groups of words (e.g., the groups of words read across frames associated with the second memory) to diagonal segments associated with a data structure (e.g., FEC data structure 700) that is stored within a third memory (e.g., associated with FEC decoder 130). In one example, optical receiver 120 may store a first group of words in a first segment that extends diagonally from a first field (e.g., associated with a first row and first column) to a second field (e.g., associated with a last row and a last column) within data structure 700.

Additionally, or alternatively, optical receiver 120 may store a second group of words in a first portion of a second segment that is adjacent to the first segment. The first portion of the second segment may extend diagonally from a first field (e.g., associated with a first row and a second column) to a second field (e.g., associated with a next-to-last row and a last column). The second segment may also, or alternatively, include one or more third fields associated with a second portion of the second segment that is not contiguous with the first portion of the second segment (e.g., associated with a last row and first column). Optical receiver 120 may write other groups of words to other segments until a first frame, associated with data structure 700, has reached capacity. Optical receiver 120 may continue to write successive groups of words to segments, associated with other frames within data structure 700, until data structure 700 has reached capacity.

Optical receiver 120 may read words from each frame, associated with data structure 700, and may perform forward error correction on data samples 212 and/or data samples 222 obtained from the words. In one example, optical receiver 120 may horizontally read words from rows (e.g., row 1, row 2, etc.), associated with a first frame within data structure 700. Optical receiver 120 may use an ECC code to identify and/or correct errors associated with data samples 212 and/or data samples 222 obtained from the words read from the rows. The ECC code may correspond to an ECC code used by optical transmitter 110 (e.g., FEC encoder 112) to encode data samples 212 and/or data samples 222.

In another example, optical receiver 120 may vertically read words from columns (e.g., column 1, column 2, etc.), associated with the first frame within data structure 700. Optical receiver 120 may use the ECC code to identify and/or correct the errors associated with data samples 212 and/or data samples 222. In yet another example, optical receiver 120 may alternate between horizontally reading words from rows and vertically reading words from columns (e.g., row 1, column 1, row 2, column 2, etc.). In any case, optical receiver 120 may read from rows and/or columns in a manner similar to that used by optical transmitter 110 (e.g., FEC encoder 112) to encode data samples 212 and/or data samples 222.

Reading the words in a different manner (e.g., from rows and/or columns) than the order in which the words were written (e.g., to segments) may cause errors, associated with words that are stored in the groups of words to be spread out over a greater quantity of words and/or samples. Spreading out the errors may allow an error rate (e.g., a symbol error rate, a bit error rate, etc.) to be reduced to a level that is less than a maximum threshold that can be processed by optical receiver 120 (e.g., FEC decoder 130). Optical receiver 120 may reassemble data symbols 211 and/or data symbols 221 based on the data samples 212 and/or data samples 222, respectively, on which the forward error correction was performed. Optical receiver 120 may output data symbols 211 and/or data symbols 221 to a client device.

A system and/or method, described herein, may permit a coherent optical receiver to perform coherent detection, on received traffic, using a coherent decoding technique to reduce and/or identify an occurrence of cycle slips within the traffic. The system and/or method may also permit the coherent optical receiver to perform the coherent detection using one or more interleaving techniques to cause an error rate, caused by the cycle slips or other phenomena, to be reduced to a level that is less than a maximum threshold for performing forward error correction. Reducing the error rate, to the level that is less than the threshold, may allow forward error correction to be performed on the traffic.

The system and/or method may permit traffic to be processed using coherent detection techniques that does not include performing differential encoding and/or decoding on the received traffic. Performing coherent optical detection, without differential encoding and/or decoding, may avoid a noise penalty (e.g., of approximately one decibel (dB)) when processing the traffic. Additionally, or alternatively, avoiding the noise penalty, may increase system reach (e.g., up to 25%) which allows the traffic to be transported greater distances than when differential encoding and/or decoding is used.

The foregoing description provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 6 and 8, the order of the blocks may be changed in other implementations. Also, non-dependent blocks may be performed in parallel.

Furthermore, while the disclosed embodiments have been presented as generally suitable for use in an optical network, the systems and methods disclosed herein are suitable for any fiber optic network, fiber network, fiber line, or link that includes one or more transmission spans, amplifier spans, or hops.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device, a block of symbols associated with a phase-modulated signal, the block of symbols including:
      data symbols that correspond to a payload associated with the signal, each of the data symbols including a plurality of bits, and
      control symbols;
   obtaining, by the network device, the control symbols from the block of symbols;
   processing, by the network device, the control symbols to identify an amount of phase noise associated with the control symbols;
   resetting, by the network device, a respective phase, associated with each of the data symbols, based on the amount of phase noise and at least one reference phase;
   interleaving, by the network device and as a result of resetting the phase, respective data samples, of each of the data symbols, with other data samples, where interleaving the respective data samples with the other samples:
      causes consecutive errors, associated with the respective data samples, to be spread out among the other data samples, and
      reduces an error rate relative to a prior error rate that existed before the interleaving; and
   performing, by the network device, forward error correction on the interleaved respective data samples,
   where the control symbols include at least one of:
   a first control symbol, associated with a first polarization, that includes:
      a first sample associated with an in-phase component of the first control symbol, and
      a second sample associated with a quadrature component of the first control symbol, or
   a second control symbol, associated with a second polarization, that includes:
      a third sample associated with an in-phase component of the second control symbol, and
      a fourth sample associated with a quadrature component of the second control symbol,
   where processing the control symbols further includes:
   multiplying the first control symbol by a first reference signal, associated with a first phase, to identify first phase noise associated with the first control symbol; and
   multiplying the second control symbol by a second reference signal, associated with a second phase, to identify second phase noise associated with the second control symbol,
   where the first phase noise corresponds to a complex signal that includes a real part and an imaginary part,
   where the real part is based on a difference between a first product defined by a real portion of the first control symbol multiplied by a real portion of the first reference signal and a second product defined by an imaginary portion of the first control symbol multiplied by an imaginary portion of the first reference signal, and
   where the imaginary part is based on a sum of a third product defined by the real portion of the first control symbol multiplied by the imaginary portion of the first reference signal and a fourth product defined by the imaginary portion of the first control symbol multiplied by the real portion of the first reference signal.

2. The method of claim 1, where one of the control symbols includes:
   a first data sample, of the respective data samples, that corresponds to a real component of the one of the control symbols and
   a second data sample, of the respective data samples, that corresponds to an imaginary component of the one of the control symbols.

3. The method of claim 1, where the control symbols are located, within the block of data symbols, at a point that is approximately midway between a first data symbol of the block of data symbols and a last data symbol of the block of data symbols.

4. A method comprising:
   receiving, by a network device, a block of symbols associated with a phase-modulated signal, the block of symbols including:
      data symbols that correspond to a payload associated with the signal, each of the data symbols including a plurality of bits, and
      control symbols;
   obtaining, by the network device, the control symbols from the block of symbols;
   processing, by the network device, the control symbols to identify an amount of phase noise associated with the control symbols;
   resetting, by the network device, a respective phase, associated with each of the data symbols, based on the amount of phase noise and at least one reference phase;
   interleaving, by the network device and as a result of resetting the phase, respective data samples, of each of the data symbols, with other data samples, where interleaving the respective data samples with the other samples:
      causes consecutive errors, associated with the respective data samples, to be spread out among the other data samples, and
      reduces an error rate relative to a prior error rate that existed before the interleaving; and
   performing, by the network device, forward error correction on the interleaved respective data samples,
   where the control symbols include at least one of:
   a first control symbol, associated with a first polarization, that includes:
      a first sample associated with an in-phase component of the first control symbol, and
      a second sample associated with a quadrature component of the first control symbol, or
   a second control symbol, associated with a second polarization, that includes:
      a third sample associated with an in-phase component of the second control symbol, and
      a fourth sample associated with a quadrature component of the second control symbol, where processing the control symbols further includes:
multiplying the first control symbol by a first reference signal, associated with a first phase, to identify first phase noise associated with the first control symbol; and
multiplying the second control symbol by a second reference signal, associated with a second phase, to identify second phase noise associated with the second control symbol,
the method further comprising:
identifying the amount of phase noise based on at least one of:
the first phase noise associated with the first control symbol, or
the second phase noise associated with the second control symbol;
determining that at least one reference phase based on the amount of phase noise; and
resetting the data symbols using a reference signal associated with the at least one reference phase.

5. A method comprising:
receiving, by a network device, a block of symbols associated with a phase-modulated signal, the block of symbols including:
data symbols that correspond to a payload associated with the signal, each of the data symbols including a plurality of bits, and
control symbols;
obtaining, by the network device, the control symbols from the block of symbols;
processing, by the network device, the control symbols to identify an amount of phase noise associated with the control symbols;
resetting, by the network device, a respective phase, associated with each of the data symbols, based on the amount of phase noise and at least one reference phase;
interleaving, by the network device and as a result of resetting the phase, respective data samples, of each of the data symbols, with other data samples, where interleaving the respective data samples with the other samples:
causes consecutive errors, associated with the respective data samples, to be spread out among the other data samples, and
reduces an error rate relative to a prior error rate that existed before the interleaving; and
performing, by the network device, forward error correction on the interleaved respective data samples,
where interleaving the respective data samples further includes:
writing the respective data samples to a plurality of columns within a first memory associated with the network device; and
reading, from the memory, the respective data samples and the other data samples based on a first order that is different than a second order to which the respective data samples were written to the plurality of columns, where reading the respective data samples and the other data samples, based on the first order, causes the respective data samples to become interleaved with the other data samples,
where reading the respective data samples and the other data samples further includes:
reading, from a plurality of rows within the first memory, a plurality of words, where each of the plurality of words that includes at least one of the respective data samples and at least one of the other data samples, and
where each of the plurality of rows corresponds to a respective field within each of the plurality of columns; and
writing the plurality of words to a frame, of a plurality of frames, within a second memory associated with the network device, where other frames, of the plurality of frames, store a plurality of other words,
the method further comprising:
reading, from the second memory, a first group of words, where each word, within the first group of words, is read from a respective first frame of the plurality of frames and where the first group words includes at least one word that stores one or more of the respective data samples; and
reading, from the second memory, a second group of words, where each word, within the second group of words, is read from a respective second frame of the plurality of frames and where the second group of words does not include any of the respective data samples.

6. The method of claim 1, where performing the forward error correction on the interleaved respective data samples further includes:
retrieving an error correction code that corresponds to another error correction code that was used to encode the respective data samples; and
performing the forward error correction, on the interleaved respective data samples, using the error correction code.

7. A system comprising:
a decoder device to:
receive a block of symbols, associated with a phase-modulated signal, the block of symbols including control symbols embedded within the block of symbols,
identify an amount of phase noise associated with the control symbols,
reset a phase associated with the block of symbols based on the amount of phase noise and a reference phase that is identified based on the amount of phase noise;
one or more interleavers to:
write samples, associated with the block of symbols, to a first memory associated with the one or more interleavers, where the samples correspond to real components and imaginary components of symbols within the block of symbols,
read, from the first memory, one or more words that include the samples and other samples, associated with one or more other blocks of symbols, in a manner that interleaves the samples with the other samples,
write the one or more words to a second memory associated with the one or more interleavers, and
read, from the second memory, one or more groups of words that include the one or more words and one or more other words, stored within the second memory, in a manner that interleaves the one or more words with the one or more other words; and
an error correction device to:
perform forward error correction on the one or more words that are interleaved with the one or more other words, and
output the one or words and the one or more other words after performing the forward error correction.

8. The system of claim 7, further comprising:
a transmitter to generate the symbols;
another error correction device to encode the symbols;
one or more other interleavers to:
arrange the samples and the other samples in an order that, when processed by the one or more interleavers, allows the decoder device to reassemble the symbols based on the arranged samples and the other samples and return the symbols to an order that was received by the transmitter; and an encoder device to:
insert the control symbols into the block of symbols.

9. The system of claim 8, where an order in which the decoder device, the one or more interleavers, or the error correction device process the symbols is reverse relative to an order that the error correction device, the one or more other interleavers, or the encoder device process the symbols.

10. The system of claim 8, where an order in which the samples written to the first memory corresponds to an order in which the samples are read from a third memory associated with the one or more other interleavers.

11. The system of claim 8, where an order in which the one or more words are read from the first memory corresponds to an order in which the one or more words are written to a third memory associated with the one or more other interleavers.

12. The system of claim 7, where, when resetting the phase, the decoder device is further to:
identify whether a noise signal, associated with the phase noise, includes a positive or negative real component and a positive or negative imaginary component,
select a first phase on which to base a reference signal, based on whether the noise signal, associated with the phase noise, includes the positive or negative real component and the positive or negative imaginary component, where the first phase corresponds to one or more multiples of a second phase associated with the other reference phase, and
generate the reference signal based on the selected first phase.

13. The system of claim 12, where, when resetting the phase, the decoder device is further to:
multiply a modified reference signal by the block of symbols to reset the phase associated with the block of symbols, where the modified reference signal corresponds to a complex conjugate of the reference signal.

14. The system of claim 7, where the error correction device is further to:
write the one or more groups of words to one or more frames within a third memory associated with the error correction device, and
read, from one of the one or more frames, a plurality of samples, associated with one group of words of the one or more groups of words, where the plurality of samples includes at least one sample, associated with the block of symbols, and
perform the forward error correction on the plurality of samples.

15. The system of claim 14, where, when writing the one or more groups of words, the error correction device is to:
write a first group of words, of the one or more groups of words, to segments associated with a first frame, of the one or more frames, where the segment corresponds to a diagonal orientation relative to the frame, where the first group of words includes approximately equal quantities of:
first samples associated with a first polarization and a first in-phase component,
second samples associated with a first polarization and a first quadrature component,
third samples associated with a second polarization and a second in-phase component, and
fourth samples associated with the second polarization and a second quadrature component and where, when reading the plurality of samples, the error correction device is to:
read the plurality of samples in a manner that alternates between rows and columns associated with the first frame, where:
the rows correspond to a horizontal orientation relative to the frame, and
the columns correspond to a vertical orientation relative to the frame.

16. A network device comprising:
a decoder component to:
receive a block of symbols, associated with a phase-modulated signal, the block of symbols including control symbols that are embedded within the block of symbols, each symbol in the block of symbols including a plurality of bits,
reset a phase associated with the block of symbols based on an amount of phase noise associated with the control symbols, where resetting the phase, when a cycle slip has occurred, causes errors to occur within samples associated with all or a portion of the block of symbols, where the samples correspond to real and imaginary components of symbols within the block of symbols;
one or more interleavers to:
interleave the samples with other samples being processed by the network device,
where interleaving the samples causes the errors, to be spread out among the other symbols; and
an error correction component to:
write, to a memory associated with the error correction component and based on a first order, the samples that are interleaved with the other samples,
read, from the memory, the samples and the other samples based on a second order that is different than the first order,
perform a forward error correction operation on the samples and the other samples to correct the errors, and
output the samples and the other samples after performing the forward error correction operation.

17. The network device of claim 16, where the cycle slip occurs when the amount of phase noise corresponds to a reference phase associated with a type of phase modulation on which the symbols are based.

18. The network device of claim 16, where resetting the phase allows a first phase, associated with the symbols, to be recalibrated to a second phase associated with a type of phase modulation on which the symbols are based.

19. The network device of claim 16, where the type of phase modulation corresponds to one of:
quadrature phase shift keying (QPSK),
binary phase shift keying (BPSK), or
a modulation format that corresponds to an order that is higher than another order associated with QPSK.

20. The network device of claim 16, where the control symbols are located, within the block of symbols, at point that is approximately half-way between a first symbol, within the block of symbols, and a last symbol within the block of symbols, and
where resetting the phase, when the cycle slip has occurred, causes the errors to occur in:
a first group of symbols between the first symbol and the control symbols,
or
a second group of symbols between the control symbols and the last symbol.

21. The network device of claim 16, where the quantity of controls signals is less than the quantity of symbols associated with the block of symbols.

22. The network device of claim 16, where, when writing the samples that are interleaved with the other samples, the error correction component is to:
   write a word associated with a portion of the samples that are interleaved with the other samples, into a field that is arranged diagonally within the memory; and
   where, when reading the symbols and the other symbols, the error correction component is to:
   read the symbols and the other symbols from other fields that are arranged horizontally or vertically within the memory.

* * * * *